United States Patent

Rondestvedt, Jr.

[15] 3,668,247
[45] June 6, 1972

[54] AROMATIC ACID CHLORIDE PROCESS

[72] Inventor: Christian S. Rondestvedt, Jr., Wilmington, Del.

[73] Assignee: E. I. du Pont de Nemours and Company, Wilmington, Del.

[22] Filed: Nov. 10, 1969

[21] Appl. No.: 875,543

[52] U.S. Cl. ...................................................260/544 M
[51] Int. Cl. ......................................................C07c 51/58
[58] Field of Search...........................................260/544 M

[56] References Cited

UNITED STATES PATENTS 3,322,822  5/1967  Gelfand................................260/544

Primary Examiner—Lorraine A. Weinberger
Assistant Examiner—Richard D. Kelly
Attorney—Francis J. Crowley

[57] ABSTRACT

Process for preparing benzene carbonyl chlorides useful as intermediates for making polyester, polyamide and the like condensation polymers by (1) mixing a trichloromethyl benzene bearing at least one additional halogen, trichloromethyl or carbonyl chloride group, all carbon-containing groups being nonadajacent to each other, with at least about two molecules of sulfur trioxide per trichloromethyl group; and (2) maintaining the mixture at a temperature at which it is molten but below which ring sulfonation occurs for a time sufficient to convert at least one trichloromethyl group to a carbonyl chloride group.

9 Claims, No Drawings

AROMATIC ACID CHLORIDE PROCESS

The subject invention relates to a process for preparing benzene carbonyl chlorides free of chlorosulfonyl groups from trichloromethyl benzenes bearing at least one additional trichloromethyl, halogen or carbonyl chloride substituent; in particular to a process for preparing isophthaloyl chloride and other benzene carbonyl chlorides from trichloromethyl benzenes by reaction with sulfur trioxide.

BACKGROUND

Aromatic acid chlorides are valuable intermediates, particularly poly acid chlorides, such as isophthaloyl chloride and terephthaloyl chloride, useful for making polyester, polyamide and the like condensation polymers. Economically attractive intermediates to the acid chlorides are trichloromethyl-substituted aromatic compounds, obtainable by chlorinating methyl-substituted aromatic compounds by methods well-known to the art. The methods proposed heretofore, however, for converting the trichloromethyl compounds to the acid chlorides, notably hydrolysis, reaction with organic acids or salts thereof, or reaction with selected metal oxides, are not entirely satisfactory from the commercial standpoint of overall production cost.

U.S. Pat. No. 2,273,974 discloses a process for preparing ring-sulfonated aromatic carboxylic acids by heating an aromatic acid chloride, such as benzoyl chloride, o-toluic acid chloride, p-chlorobenzoyl chloride or naphthoyl chloride, with sulfuric anhydride ($SO_3$) or chlorosulfonic acid at temperatures ranging from about 80 (boiling $CCl_4$) to about 160° C.

U.S. Pat. No. 3,322,822 discloses a process for preparing chlorosulfonyl benzoyl chlorides by heating benzotrichlorides bearing at least one ring hydrogen with sulfur trioxide at 50° to 200° C., whereby the benzotrichloride's trichloromethyl group is converted into a carbonyl chloride and a ring hydrogen is replaced by a chlorosulfonyl group.

LeFave and Scheurer, *J. Am. Chem. Soc.* 72, 2464 (1950), discloses heating benzotrichloride or trifluoride with alcohols in 100 percent sulfuric acid produces alkyl benzoates. The authors speculate benzoyl halide may be an intermediate in the overall esterification reaction.

U.S. Pat. No. 2,856,425 describes converting aromatic trihalomethyl compounds to aromatic acid chlorides by heating (above 50° C. and preferably between 150° and 300° C.) with oxides of fourth and fifth group metals having atomic numbers in the 22 to 51 range, including specifically Ti, V, As, Zr and Sb.

The choice of oxide is apparently critical. The patent states only the selected metal oxides give smooth reactions and pure products; that many other metal oxides react with trichloromethyl groups, but violently in many cases, with unwanted by-products resulting in major proportions.

What is thus needed is an economically attractive process for preparing benzene carbonyl chlorides from trichloromethyl benzenes which effects the $CCl_3$— to —COCl reaction smoothly and efficiently under mild conditions without introducing additional substituents into the aromatic rings.

BRIEF SUMMARY OF THE INVENTION

These needs and other advantageous objectives are attained according to the subject novel process for preparing benzene carbonyl chlorides free of chlorosulfonyl groups by the steps of 1. mixing (A) a trichloromethyl benzene bearing one–five substituents separately selected from halogen, carbonyl chloride and additional trichloromethyl groups, no more than two being carbon-containing groups and all the carbon-containing groups ($CCl_3$ and COCl) being on positions nonadjacent to each other, with (B) sulfur trioxide in an amount corresponding to at least about two molecules of $SO_3$ per $CCl_3$ group;

2. maintaining the mixture at a temperature (usually −25° to 150° C., preferably 0° − 100° C.) at which it is molten but below which ring sulfonation occurs for a time sufficient to convert at least one trichloromethyl group to a carbonyl chloride group; and 3. recovering a benzene carbonyl chloride which has at least one more carbonyl chloride group than the starting benzene compound and which is free of chlorosulfonyl groups. By free of chlorosulfonyl groups is means essentially free, i.e., at most only a very small percentage is present in the final product.

A preferred process embodiment includes distilling the reaction mass from Step (2) to remove unreacted $SO_3$ and to separate by-product pyrosulfuryl chloride from the benzene carbonyl chloride product. Still another preferred embodiment includes distilling the benzene carbonyl chloride product to separate it from any higher boiling material that may have been produced.

Preferred trichloromethyl benzenes include those which bear only one additional trichloromethyl or carbonyl chloride group in either the meta or para position and bear zero–two ring chloro groups, as for example, converting 1,3-bis-(trichloromethyl)benzene to isophthaloyl chloride.

DETAILED DESCRIPTION OF THE INVENTION

In marked contrast to the above references which disclose that trichloromethyl benzenes and benzoyl chlorides are chlorosulfonated on reaction with sulfur trioxide, the invention process is based on the discovery that, where the trichloromethylbenzene contains at least one nuclear halogen substituent or at least one other $CCl_3$ (trichloromethyl) group or a COCl (carbonyl chloride) group, the reaction is readily controlled by adjusting the temperature so that the $SO_3$ reacts almost exclusively with the $CCl_3$ groups. In other words, carbonyl chloride formation occurs without the concurrent ring-chlorosulfonation that characterizes the previous practices utilizing sulfur trioxide.

This is a particularly valuable discovery for sulfur trioxide is abundant and cheap, reacts rapidly at moderate temperatures, and affords the desired benzene carbonyl chlorides in high yields.

The by-product pyrosulfuryl chloride, $S_2O_5Cl_2$, is a chlorinating, chlorosulfonating and sulfonating agent and may be used to produce sulfur trioxide, sulfur dioxide and chlorine, all valuable reagents.

Thus in employing the readily available and relatively low cost sulfur trioxide reagent and producing valuable by-products along with the desired aromatic acid chlorides, the subject process constitutes an important advance in the art.

The trichloromethyl compounds that may be efficiently converted into benzene carbonyl chlorides without suffering substantial chlorosulfonation include 3-chlorobenzotrichloride, 4-chlorobenzotrichloride, 4-fluorobenzotrichloride, 4-bromobenzotrichloride, 4-iodobenzotrichloride, 3,4-dichlorobenzotrichloride, pentachlorobenzotrichloride, 1,3-bis(trichloromethyl)benzene, 1,4-bis(trichloromethyl)benzene, 1,3,5-tris(trichloromethyl)-benzene and such benzenes containing ring-chloro substituents, as in 4-chloro-1,3-bis(trichloromethyl)benzene, 5-chloro-1,3-bis(trichloromethyl)benzene, 4,6-dichloro-1,3-bis(trichloromethyl)benzene, 4,5,6-trichloro-1,3-bis(trichloromethyl)-benzene, 2-chloro-1,4-bis(trichloromethyl)benzene, 2,5-dichloro-1,4-bis(trichloromethyl)benzene, and 2-chloro-1,3,5-tris(trichloromethyl)benzene. The trichloromethyl compounds also include trichloromethyl benzenes which already bear one or more carbonyl chloride groups such as α,α,α-trichloro-m-toluyl chloride, para-chloro-α,α,α-tetrachloro-m-toluyl chloride, α,α,α-trichloro-p-toluyl chloride, ortho-chloro-α,α,α-tetrachloro-p-toluyl chloride, 5-trichloromethyl-isophthaloyl chloride. Mixtures of any two or more of the above compounds may be used, if desired, to produce mixtures of benzene carbonyl chlorides.

The bis(trichloromethyl)benzenes are preferred reactants. These materials, as prepared by side chain chlorinating meta- and para-xylene, may contain small quantities of ring chlorinated derivatives, such as those represented above, and may be converted into the corresponding isophthaloyl and terephthaloyl chlorides by the process of this invention.

The sulfur trioxide may be employed as vapor, liquid or solid. The liquid (b.p.44.5° C.) is particularly convenient to handle and is preferred. It can be obtained directly, in a state fairly stable against solidification (polymerization), by distillation of any of the various physical modifications before use. The tendency of the liquid form to polymerize, which is promoted by water and sulfuric acid, can be counteracted with certain additives, e.g., $P_2O_5$ in small amounts. Liquid $SO_3$ containing a liquid-state stabilizer is available commercially and has been used with good results. The $SO_3$ may also be employed in a non-interfering carrier solvent such as perchloroethylene, 1,2-dichloroethane, 1,1,2,2-tetrachlorethane, 1,1,2-trichloro-1,2,2-trifluoroethane (preferred), carbon tetrachloride, dioxane, and N,N-dimethyl formamide. To minimize $SO_3$ attack on such solvent, the temperature is preferably kept below 100° C. or the decomposition temperature, whichever is lower.

In the broad aspect of the process, a trichloromethylbenzene bearing at least one halogen (preferably F or Cl) or at least one additional trichloromethyl or carbonyl chloride group (as defined) is mixed and maintained in intimate contact with sulfur trioxide, under agitation and with heating if necessary, to effect the transformation of one or more trichloromethyls to carbonyl chloride groups without suffering ring sulfonation. The reaction course and stoichiometry may be represented by the following:

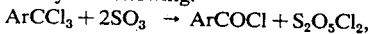
$$ArCCl_3 + 2SO_3 \rightarrow ArCOCl + S_2O_5Cl_2,$$

where Ar stands for a benzene radical bearing additional $CCl_3$, COCl or halogen groups as defined above.

The reaction proceeds at low temperatures, for example, as low as about −25° C., as evidenced by the evolution of heat, with the 0° to 100° C. range preferred, particularly 20°–80° C. Higher temperatures, say 100° to 150° C., may be used, provided the chlorosulfonation reaction does not become competitive with the $CCl_3$ to COCl transformation at the elevated temperatures. Such higher temperatures, though seldom necessary, are sometimes beneficial for driving the reaction to completion. As the $CCl_3$ to COCl transformation occurs, the sulfur trioxide concentration decreases so that in the later stages the $SO_3$ concentration is relatively low and the possibility that the carbonyl chloride reaction product would undergo sulfonation is low. Thus the reaction temperatures may be safely increased to above 100° C. if necessary to complete the $CCl_3$ to COCl transformation. By temperature at which the mixture is molten is meant the temperature at which the reactants, with or without solvent present, form an intimate liquid mixture.

The preferred and optimum temperatures outlined above vary with the substituents and their number on the benzene ring. In general, the higher the temperature the faster the desired reaction, but the greater also the susceptibility of the benzene ring to chlorosulfonation. Carbonyl chloride (COCl) groups are better than trichloromethyl ($CCl_3$) groups which are better than the halogens in decreasing susceptibility to chlorosulfonation. Also, the greater the number of substituents the less the susceptibility to chlorosulfonation.

The reaction stoichiometry requires 2 molecules of sulfur trioxide for each trichloromethyl group to be converted, and best results are obtained with at least such proportion. A slight $SO_3$ excess is advantageously employed for high conversions; the total quantity normally ranges from 2 to 2.5 moles $SO_3/CCl_3$ group (preferably 2–2.25). With smaller proportions conversions are incomplete. Larger proportions appear to be unnecessary, but may be used, provided the reaction temperature is kept low to minimize the possibility of ring chlorosulfonation.

Where the benzene compound contains more than one trichloromethyl group the transformation to carbonyl chloride may be conducted stepwise, employing a fraction, e.g. one-third to one-half of the overall stoichiometric $SO_3$ amount for complete conversion to polycarbonyl chloride. In such embodiment, the reaction product comprises mono-carbonyl chloride and unreacted poly(trichloromethyl)benzene, along with small proportions of benzene poly-carbonyl chloride. Increasing the $SO_3$ to $CCl_3$ compound mole ratio increases the degree of conversion to the poly-carbonyl chloride.

The reaction course may be followed by various analytical techniques such as infrared or gas chromatography which detect the disappearance of $CCl_3$ groups and the appearance of COCl groups. The reaction times, temperatures and $SO_3$ to trichloromethyl compound mole ratios can be adjusted accordingly to obtain the desired result.

The reaction may be conducted at ordinary atmospheric pressures, also at super atmospheric pressures to minimize escape of the relatively volatile sulfur trioxide from the reaction mass. When operating in systems open to the atmosphere, it is desirable to add the sulfur trioxide to the trichloromethyl compound and to adjust the addition rate and the reaction temperature such that the $SO_3$ is consumed substantially as fast as it is fed.

When the reaction is substantially complete, the reaction mass is distilled, at atmospheric or preferably reduced pressures, first to recover any unreacted sulfur trioxide and the pyrosulfuryl chloride, then the higher boiling acid chloride, which if necessary may be distilled at reduced pressures as disclosed in British Pat. No. 946,491 and in U.S. Pat. No. 2,856,425. Where the acid chloride is normally solid, or not distillable, it may be purified by crystallization from melts or from solvents as is also well-known to the art. The process may be made semi-continuous or continuous, by intermittently or continuously feeding to a reactor maintained at operating temperatures the trichloromethyl and $SO_3$ reactants, and removing the inorganic and the aromatic chloride products from the reaction system at the same rate.

EXAMPLES

The examples which follow illustrate the invention but are not in limitation thereof.

Other materials and conditions as described above may likewise be employed with advantageous results.

Quantities where given are in parts by weight, temperatures in °C.

Example 1 (Molecules $SO_3/CCl_3$ group = 2.13)

68 Parts (0.85 mole) of a stabilized liquid sulfur trioxide (purchased commercially as "Sulfan B") was added over a 7 minute period to 62.6 parts (0.2 mole) of 1,3-bis(trichloromethyl)benzene, under agitation and initially at about 25°. The reaction mixture was cooled intermittently during the $SO_3$ addition but the temperature was allowed to rise to 58°. Five minutes after the $SO_3$ had been added the reaction mixture was sampled and the organic content found to contain about 90 percent isophthaloyl chloride by vapor phase chromatography; the rest was almost entirely α,α,α-trichloro-m-toluyl chloride together with a small quantity of unreacted bis(trichloromethyl)benzene.

The remaining mixture was agitated at 45° for 50 minutes, then heated from 103° to 136° for 2 hours, and distilled at reduced pressures in a one-plate still to yield 71.7 parts (83.7 percent yield) of pyrosulfuryl chloride, b.p. 72°–74°/50 mm Hg pressure, 2.2 parts (2.5 percent yield taken as $S_2O_5Cl_2$) of an intermediate fraction of impure pyrosulfuryl chloride, and 35.3 parts (87 percent yield) of isophthaloyl chloride, b.p. 127°/5 mm Hg pressure. In addition, there was recovered in cold traps 9.9 parts (12 percent) of $SO_3$ which had volatized from the reaction mass during the reaction and distillation workup.

The isophthaloyl chloride fraction contained a small amount of α,α,α-trichloro-m-toluyl chloride. It can be completely separated therefrom by fractional distillation.

Similarly, other poly(trichloromethyl)benzenes and trichloromethyl benzoyl chlorides, as described above, are converted by SO₃ under substantially similar conditions into the corresponding benzene poly-carbonyl chlorides in good yields.

Example 2 — p-Chlorobenzoyl Chloride

Liquid sulfur trioxide (50 parts, 0.63 mole) was added dropwise during 33 minutes to p-chlorobenzotrichloride (69 parts, 0.3 mole) under agitation at −12° to −3°. The mixture was allowed to warm slowly to room temperature, held there for a total of 2 hours, and then rapidly distilled in a one-plate still to separate the product from a small amount (2.7 parts) of tarry residue. The distillate was then fractionally distilled, under reduced pressures, through a column packed with glass helices to obtain pyrosulfuryl chloride (36.2 parts, b.p. 70°/45 mm), an intermediate fraction (9.5 parts), and p-chlorobenzoyl chloride (42.3 parts, 81 percent yield, b.p. 128° – 132°/44 mm).

Example 3 — 3,4-Dichlorobenzoyl Chloride

Liquid sulfur trioxide (0.63 mole) was added dropwise to 3,4-dichlorobenzotrichloride (0.3 mole) during 40 minutes with the temperature being maintained at 5° – 14° by cooling as necessary with an ice bath. The mixture was allowed to warm to room temperature over a 2 hour period, then heated over another 1.5 hour period to 56°, and finally distilled under reduced pressures to yield pyrosulfuryl chloride (b.p. 58° – 75°/38 mm, 41.8 parts, 97.5 percent yield) and 3,4-dichlorobenzoyl chloride (b.p. 121°– 123°/13–15 mm, 35.4 parts, 84.6 percent yield), which solidified at room temperature.

Example 4 — p-Fluorobenzoyl Chloride

Liquid sulfur trioxide (0.63 mole) was added during 110 minutes to p-fluorobenzotrichloride (0.3 mole) under agitation at 20° C. The reaction was only slightly exothermic. The mixture was held at 25° for 1 hour, then at about 45° for another hour, and distilled rapidly in a one-plate still to separate the product from a small amount of high-boiling material. The distillate was then fractionally distilled under reduced pressure in a glass packed column to obtain pyrosulfuryl chloride and then p-fluorobenzoyl chloride (b.p. 104°/41 mm) in about 95 percent yield.

Example 5 — Terephthaloyl Chloride

Liquid sulfur trioxide (0.88 mole) was added to 1,4-bis(trichloromethyl)benzene (0.2 mole) at room temperature over a 1 hour period during which time the solid hexachloride liquefied rapidly, and the reactor was externally cooled to keep the temperature at 20° – 25°, except for the last 15 minutes when the temperature was allowed to rise to 56°. The mixture was held at about 50° for 0.5 hour, then distilled under reduced pressure to obtain pyrosulfuryl chloride and crude terephthaloyl chloride in near quantitative yield. Redistillation gave vpc- pure terephthaloyl chloride in 97 percent overall yield, melting point 80° – 81°.

Substantially similar results are obtained with reaction temperatures ranging from about 20° to 75° C.

The foregoing detailed description has been given for clearness of understanding only, and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. Process for preparing benzene carbonyl chlorides which comprises
   a. mixing a trichloromethyl benzene bearing one–five additional groups selected from halogen, trichloromethyl and carbonyl chloride, there being no more than two of the additional carbon-containing groups, all of the trichloromethyl and carbonyl chloride groups being on ring positions nonadjacent to each other, with at least about two molecules of sulfur trioxide per trichloromethyl group;
   b. maintaining the mixture at a temperature within the range −25° to 150° C. at which the mixture is molten but below which ring sulfonation occurs for a time sufficient to convert at least one trichloromethyl group to a carbonyl chloride group; and
   c. recovering a benzene carbonyl chloride which has at least one more carbonyl chloride group than the starting benzene compound and which is free of chlorosulfonyl groups.

2. Claim 1 wherein about 2–2.5 molecules of SO₃ are employed per trichloromethyl group.

3. Claim 2 wherein the mixture from Step (b) is distilled to separate and recover by-product pyrosulfuryl chloride from the benzene carbonyl chloride product.

4. Claim 2 wherein the trichloromethyl benzene bears one additional trichloromethyl or carbonyl chloride group in the meta position and zero–three ring chloro groups.

5. Claim 2 wherein the trichloromethyl benzene bears one additional trichloromethyl or carbonyl chloride group in the para position and zero–three ring chloro groups.

6. Claim 2 wherein the trichloromethyl benzene bears one–two additional chlorine or fluorine groups.

7. The process for preparing isophthaloyl chloride which consists essentially of
   a. mixing 1,3-bis(trichloromethyl)benzene with about 4–4.5 moles of sulfur trioxide per mole of said 1,3-bis(trichloromethyl)benzene;
   b. heating the mixture at 0° – 100° C. for a time sufficient to convert the trichloromethyl groups to carbonyl chloride groups essentially without chlorosulfonating the benzene ring;
   c. distilling by-product pyrosulfuryl chloride from the resultant mixture; and
   d. recovering isophthaloyl chloride from the remaining residue by distillation under reduced pressures.

8. Claim 7 wherein the temperature is 20° – 80° C.

9. The process for preparing terephthaloyl chloride which consists essentially of
   a. mixing 1,4-bis(trichloromethyl)benzene with about 4–4.5 moles of sulfur trioxide per mole of said 1,4-bis(trichloromethyl)benzene;
   b. heating the mixture at 20° – 80° C. for a time sufficient to convert the trichloromethyl groups to carbonyl chloride groups essentially without chlorosulfonating the benzene ring;
   c. distilling by-product pyrosulfuryl chloride from the resultant mixture; and
   d. recovering terephthaloyl chloride from the remaining residue by distillation under reduced pressures.

* * * * *